United States Patent
Kashyap et al.

(10) Patent No.: US 7,739,405 B2
(45) Date of Patent: *Jun. 15, 2010

(54) MULTICAST GROUP MANAGEMENT IN INFINIBAND

(75) Inventors: Vivek Kashyap, Beaverton, OR (US); Gregory Francis Pfister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/274,158

(22) Filed: Nov. 19, 2008

(65) Prior Publication Data

US 2009/0070422 A1 Mar. 12, 2009

Related U.S. Application Data

(63) Continuation of application No. 10/631,053, filed on Jul. 31, 2003, now Pat. No. 7,574,526.

(51) Int. Cl.
*G06F 15/16* (2006.01)
(52) U.S. Cl. .................. 709/242; 709/201; 709/253
(58) Field of Classification Search ......... 709/230–244, 709/253; 370/400–405
See application file for complete search history.

(56) References Cited

U.S. PATENT DOCUMENTS

| | | | |
|---|---|---|---|
| 6,331,983 B1 | 12/2001 | Haggerty et al. | |
| 6,507,586 B1 | 1/2003 | Satran et al. | |
| 7,079,495 B1 | 7/2006 | Pearce et al. | |
| 2002/0097728 A1 | 7/2002 | Hinderks et al. | |

OTHER PUBLICATIONS

SearchStorage.com Definition of InfiniBand, SearchStorage.com Definitions Powered by Whatis.com, Jun. 5, 2001, pp. 1-4, <http://searchstorage.techtarget.com/sDefinition/0,290660,sid5_gci214596,00.html>.
Pentakalos, "An Introduction to the Infiniband Architecture", O'Reilly Network, Feb. 4, 2002, pp. 1-8, <http://www.oreillynet.com/lpt/a/1535>.
"Infiniband Architecture Specification", vol. 1, Release 1.1, Infiniband Trade Association, Nov. 6, 2002, Chapters 1, 3, and 13-15, <http://www.infinibandta.org/specs/register/publicspec/>.

*Primary Examiner*—Joseph Thomas
*Assistant Examiner*—Brendan Higa
(74) *Attorney, Agent, or Firm*—Yee & Associates, P.C.; Diana R. Gerhardt

(57) ABSTRACT

A mechanism for managing multicast groups with send-without-receive (SWR) joiners without the use of traps on creation and deletion of groups is provided. Group information is maintained continuously while the SWR member exists. When an SWR join is attempted and the group does not already exist, the group information (MLID) is marked as used and the first switch to which the SWR packets are sent is routed to discard all packets sent to the group. When receiving members join the group, the routing is updated so that the SWR member begins sending to the receiving members. When the last receiving member leaves the group, the first switch is again routed to discard the packets.

9 Claims, 3 Drawing Sheets

MULTICAST GROUP MANAGEMENT IN INFINIBAND

This application is a continuation of application Ser. No. 10/631,053, filed Jul. 31, 2003.

BACKGROUND OF THE INVENTION

1. Technical Field

The present invention relates to an improved data processing system and, in particular, to system area networks. Still more particularly, the present invention provides a method and apparatus for multicast group management with send-without-receive group members.

2. Description of Related Art

InfiniBand (IB), which is a form of System Area Network (SAN), defines a multicast facility that allows a Channel Adapter (CA) to send a packet to a single address and have it delivered to multiple ports. The InfiniBand architecture is described in the InfiniBand standard, which is hereby incorporated by reference.

A unicast packet is sent from one node to one other node. The unicast packet includes in the header a unique address for the target node. The routers and switches route the packet to the target node based on the unique address or identifier.

In contrast, a multicast packet is sent to all ports of a collection of ports called a multicast group. These ports may be on the same or different nodes in the SAN. Each multicast group is identified by a unique multicast local identifier (MLID). The MLID is used for directing packets within a subnet. The MLID is in the header of the IB packet.

An IB management action via a Subnet Management Packet (SMP) is used when a node joins a multicast group, and at that time the LID of the port on the node is linked to the multicast group. The subnet's Subnet Manager (SM) then stores this information in the switches of its subnet using SMPs. The SM, via SMPs, tells the switches the routing information for the various multicast groups, and the switches store that information, so that the switches can route the multicast packets to the correct nodes.

When a node is going to send a packet to the multicast group, it uses the MLID of the group to which it wants the packet to be delivered. The switches in the subnet detect the MLID in the packet's destination local identifier (DLID) field and replicate the packet, sending it to the appropriate ports, as previously set up by the SM.

Multicast group members may send packets without receiving. These group members, referred to as send-without-receive (SWR) members, are commonly needed for streaming data multicast, for example, or compatibility with other common multicast implementations, such as Internet Protocol (IP) multicast.

Switched media, such as InfiniBand, do not automatically allow participants to send without joining the group. All communication must be explicitly routed by switching elements, including sending data without receiving. When a join request is sent, the SM programs the switches to forward the multicast packets to the nodes that have requested to join the group and to receive the packets.

However, when a SWR member initially joins a group and the group does not already exist, then there is the issue of a SWR member sending with no receivers. Currently, the IB architecture does not create the group. Instead, the SWR joiner must sign up to receive a trap message that is emitted whenever any group is created. The SWR may then inspect each trap message to see which group has been created. When it finds that the group of interest is created, the SWR joiner can repeat its request to join that group with some hope of success. "Signing up" to receive a trap is done by sending a message to an entity called "Subnet Administration" (SA) that is associated with the SM. When the group has been successfully joined, the SWR joiner usually eliminates its subscription to those trap messages by sending another message requesting that operation.

Also, when the last receiving member leaves the group, the IB architecture currently deletes the group, even if the SWR is still sending. Therefore, the SWR must sign up to receive the additional trap messages which signal the deletion of any group, and continually inspect them to see if its group of interest has been deleted. Having discovered this deletion, the SWR must then purge its MLID information about that group, since the SM may re-use the same MLID value for a different group. Otherwise the SWR may send packets to the wrong group.

When the group to which the SWR is sending is deleted, the SWR must then sign up again to receive a trap message whenever a group is created and the process repeats until the SWR stops sending to the group. In this way, the SWR only joins a group when there are receivers and is forced to wait when there are no receivers.

However, this process results in a significant overhead for the SM and the SWR joiner. The SWR receives a message for every group created, whether it is a group of interest or not. The SWR must also receive a message for every deleted group, not just when the specific group of interest is deleted. Whenever the SWR is attempting to send to the group, these messages are being generated by the SM and received by the SWR joiner.

Therefore, it would be advantageous to provide an improved method and apparatus for multicast group management in InfiniBand.

SUMMARY OF THE INVENTION

The present invention provides a method and apparatus for managing multicast groups with send-without-receive (SWR) joiners without the use of traps on creation and deletion of groups. The mechanism of the present invention maintains group information continuously while the SWR member exists. When an SWR join is attempted and the group does not already exist, the group information (MLID) is marked as used and the first switch to which the SWR packets are sent is routed to discard all packets sent to the group. When receiving members join the group, the routing is updated so that the SWR member begins sending to the receiving members. When the last receiving member leaves the group, the first switch is again routed to discard the packets.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
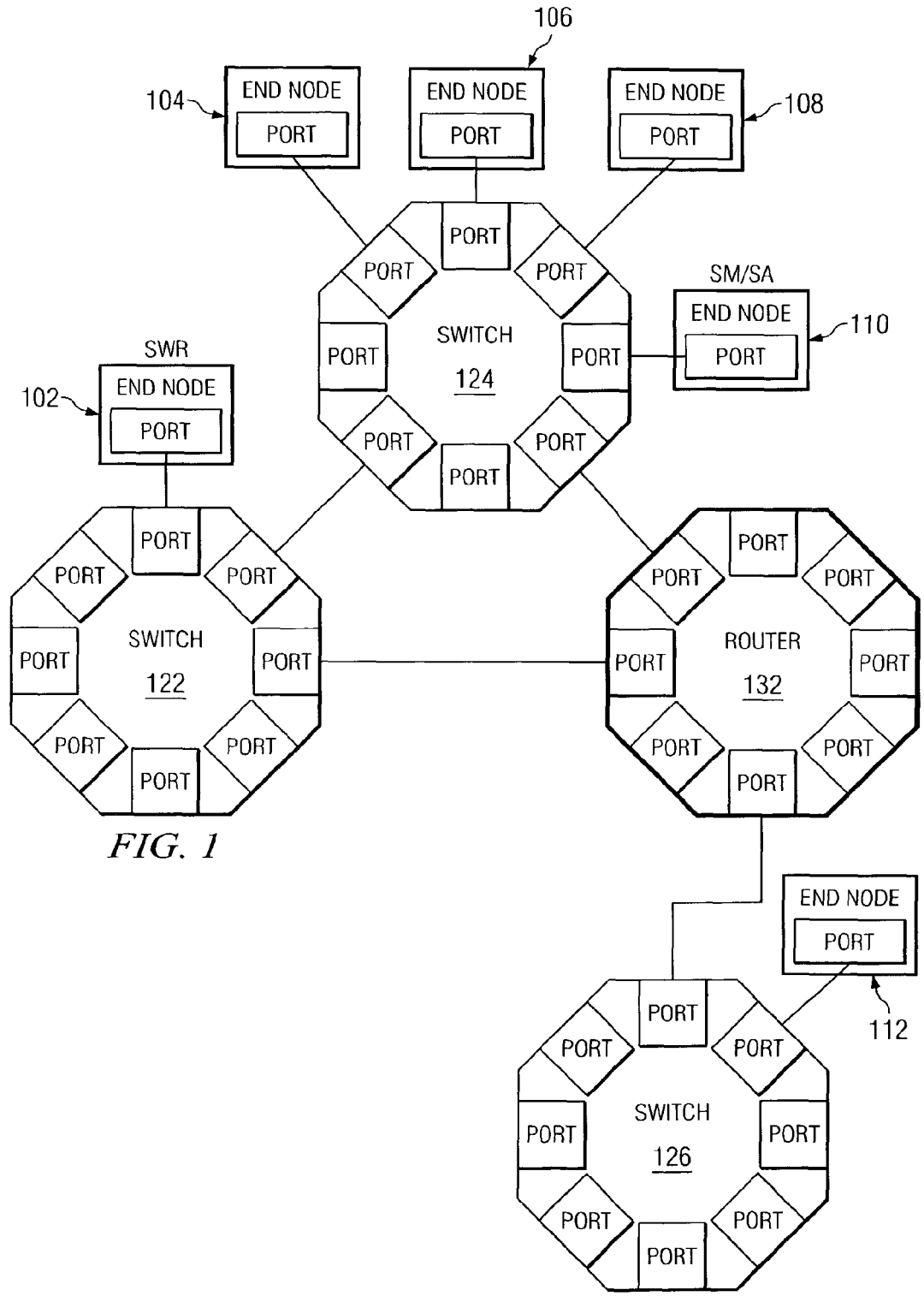
FIG. 1 is an example of a system area network in accordance with a preferred embodiment of the present invention.

Referring to FIG. 1, an example of a system area network (SAN), which hereafter will be referred to as the network, is illustrated in accordance with a preferred embodiment of the present invention. The network is comprised of a plurality of end nodes 102-112. These end nodes are coupled to one another via communication links, one or more switches 122, 124, 126, and one or more routers 132. A switch is a device that routes packets from one link to another of the same subnet. A router is a device that routes packets between network subnets. An end node is a node in the network that is the final destination for a packet.

In the network shown in FIG. 1, endnode 110 is shown as containing a Subnet Manager (SM) and Subnet Administration (SA). These correspond to InfiniBand Architecture's split of SAN management functions between (1) the SM, an entity that sends and receives only special messages able to affect routing and network hardware configuration; and (2) SA, an entity that only sends and receives normal communication messages that cannot affect network configuration. SA is used as a means of communicating with SM using normal messages. This is done for purposes of description only; the invention discussed may make use of other facilities for management of the subnet.

In the network shown in FIG. 1, one of the end nodes may request to join a multicast group. This is accomplished by sending a join request to SA at node 110. The SA may then create the multicast group, assign the group a multicast local identifier (MLID), and cause the SM to update the switches to route the packets to the members of the group.

Multicast group members may also send packets without receiving. These group members are referred to as send-without-receive (SWR) members. For example, endnode 102 may send a join request to SA node 110, wherein the request specifies that node 102 is to be a SWR member of the group. Thus, the switches in the subnet are updated to route packets from node 102 to the other members of the group, but not to route any packets to node 102.

However, when an SWR member initially joins a group and the group does not already exist, then there is the issue of a SWR member sending with no receivers. In accordance with a preferred embodiment of the present invention, when a SWR member requests to create a group, the SA creates the group, assigns an MLID, and updates the first switch, in this case switch 122, to discard the multicast packets from SWR node 102. This is provided for in the IB switch hardware.

When receiving nodes join the multicast group, the SA then updates the switches so that the SWR member begins sending packets to the receiving members. Similarly, when the last receiving member leaves the multicast group but the SWR member remains, the SA again routes the first switch, switch 122 in the example shown in FIG. 1, to discard the multicast packets from SWR node 102.

This invention also encompasses, without change, the case of multicast groups which span subnets. For example, if node 112 is a receiving member of a multicast group in one subnet, and node 102 is an SWR member in another (as illustrated in FIG. 1), then packets from node 102 will be routed through switch 122 to router 132 and then to node 112 through switch 126. If node 112 leaves the multicast group, leaving no members, SM updates the routing of switch 122 to discard the packets sent from node 102. Those packets are then no longer sent to node 112.

Figures 2, 3A, 3B, 3C, 3D:
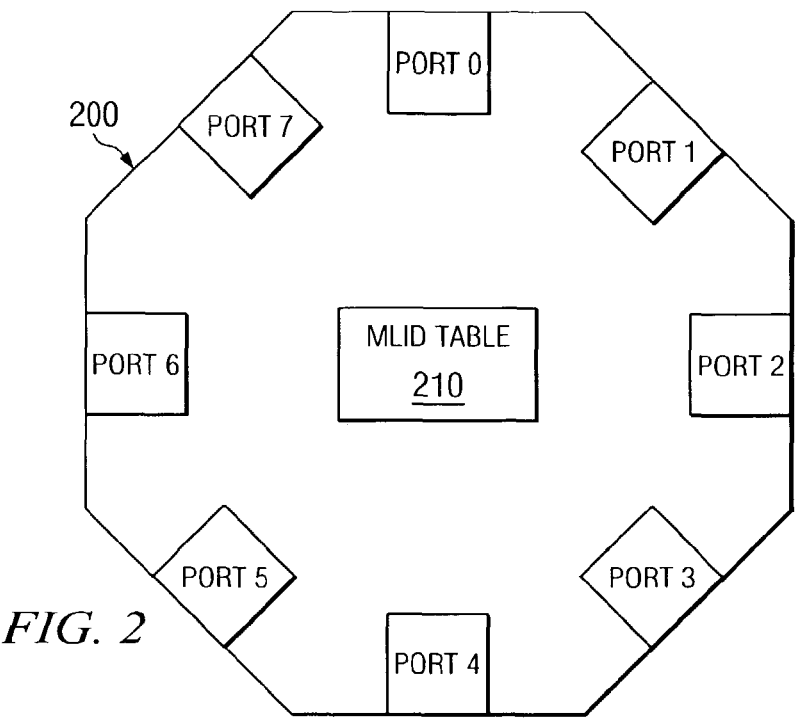
FIG. 2 is a diagram illustrating a switch in accordance with a preferred embodiment of the present invention.
FIGS. 3A-3D illustrate example multicast routing data structures in accordance with a preferred embodiment of the present invention.

With reference now to FIG. 2, a diagram is shown illustrating a switch in accordance with a preferred embodiment of the present invention. In this example, switch 200 includes eight ports, port 0 through port 7. A switch may have more or fewer ports within the scope of the present invention, depending on the implementation. For example, a common IB switch may have only four ports. The port numbering convention may also change depending upon the specific hardware used or the particular implementation.

Switch 200 also includes multicast local identifier (MLID) table 210. The MLID table is used to route multicast packets to receiving members of the multicast group. For example, switch 200 may receive a multicast packet at port 5. According to MLID table 210, the switch may replicate the packet and forward the packet to port 1, port 3, and port 7. However, in any such implementation the switch does not send a packet back out of the port on which it was received; otherwise, multicast packets would never cease circulating.

MLID table may indicate that packets for a particular MLID are to be discarded. In accordance with a preferred embodiment of the present invention, switch 200 also is configured to discard packets when necessary. For example, switch 200 may receive a multicast packet (from any port) with an MLID of a particular value. MLID table 210 may indicate that packets for this MLID are to be discarded. Rather than replicating and forwarding the packet, switch 200 simply discards the packet.

FIGS. 3A-3D illustrate example multicast routing data structures in accordance with a preferred embodiment of the present invention More particularly, with respect to FIG. 3A, MLID table 300 includes a MLID column and a ports column. MLID table 300 is an example of a multicast routing data structure in accordance with the present invention. When a multicast group is created by the subnet administrator, a MLID is assigned to the group and a record, row, or entry for the MLID is added to the appropriate multicast routing data structures. Other methods may be used. For example, each MLID may be implicitly associated with its index in the table. Then, the MLID column would not be explicitly present and some mechanism may be provided to indicate that an entry is not in use.

In accordance with a preferred embodiment of the present invention, when an SWR node joins a group that does not already exist, SA will create the multicast group and update the multicast routing table for the first switch to discard the packet. FIG. 3B illustrates an example multicast routing table with an entry for a multicast group with a single SWR member. In this example, the MLID of "1" is assigned to the multicast group and an entry is stored in MLID table 310. The switch is set to simply discard the packets for this group, rather than to forward the packets to a specific port or ports. A number of mechanisms may be used to indicate that the packet is to be discarded, including but not limited to indicating a non-existent port number; or incorporating a bit which, when "1," indicates that the packet is to be discarded.

For example, if SWR node 102 in FIG. 1 joins a multicast group that does not already exist, then the SA at node 110 creates the multicast group and assigns a MLID to the group. The SM then updates the multicast routing table for switch 122 to discard packets for this multicast group. An example of such a multicast routing table for switch 122 is shown in FIG. 3B.

Next, with reference to FIG. 3C, an example multicast routing data structure is shown after a receiving member joins the multicast group. In this example, MLID table 320 indicates that packets for multicast groups having a MLID of "1" are to be forwarded to port 7 using the port numbering convention shown in FIG. 2.

For example, if SWR node 102 is a member of the multicast group with a MLID of "1," and one or more of nodes 104, 106, 108 are receiving members, then packets received from node 102 at switch 122 are forwarded to switch 124. The SM then updates the multicast routing table for switch 122 to forward these packets accordingly. An example of such a multicast routing table for switch 122 is shown in FIG. 3C.

Turning now to FIG. 3C, an example multicast routing data structure is shown for a plurality of receiving members. In this example, MLID table 330 indicates that packets for multicast groups having a MLID of "1" are to be forwarded to port 1, port 3, and port 7 using the port numbering convention shown in FIG. 2.

For example, if nodes 104 and 108 of FIG. 1 are members of the multicast group with a MLID of "1," then packets received at switch 124 are forwarded to port 1 and port 7 (unless they were received from ports 1 or 7), using the port numbering convention shown in FIG. 2. The SM then updates the multicast routing table for switch 124 to forward these packets accordingly. If there are receiving members on another subnet, then switch 124 may also be updated to forward packets to router 132 through port 3. An example of such a multicast routing table for switch 124 is shown in FIG. 3D.

Similarly, when the last receiving member leaves the multicast group but the SWR member remains, the SA again routes the first switch to discard the multicast packets from the SWR node. Continuing with the example shown in FIG. 1, if receiving nodes 104, 108 and all other receiving nodes leave the multicast group, then the SA updates the multicast routing table for switch 122 to discard packets for this multicast group. An example of such a multicast routing table for switch 122 again is shown in FIG. 3B.

While the MLID routing data structures are shown in FIGS. 3A-3D as tables, these tables are meant to be illustrative of the present invention and not to limit the invention. In practice, the MLID routing data structures, which may be referred to as MLID tables, may be implemented as a plurality of entries consisting of a series of bits. A packet is routed to a port if the bit for that port is a "1" and is not routed to the port if the bit is a "0."

Furthermore, the MLID routing data structure likely will not include an "MLID" column. Rather, the data structure may be indexed by the MLID. In other words, the location within the MLID data structure is indicative of an MLID value. Thus, all MLID tables inherently include entries for MLID values between 0 and the number of table entries minus one. A bit may be provided for each MLID that indicates whether packets are to be discarded for the group. Thus, if this bit has a value of "1" for a particular MLID, then all packets received for this MLID will be discarded.

Figure 4A:
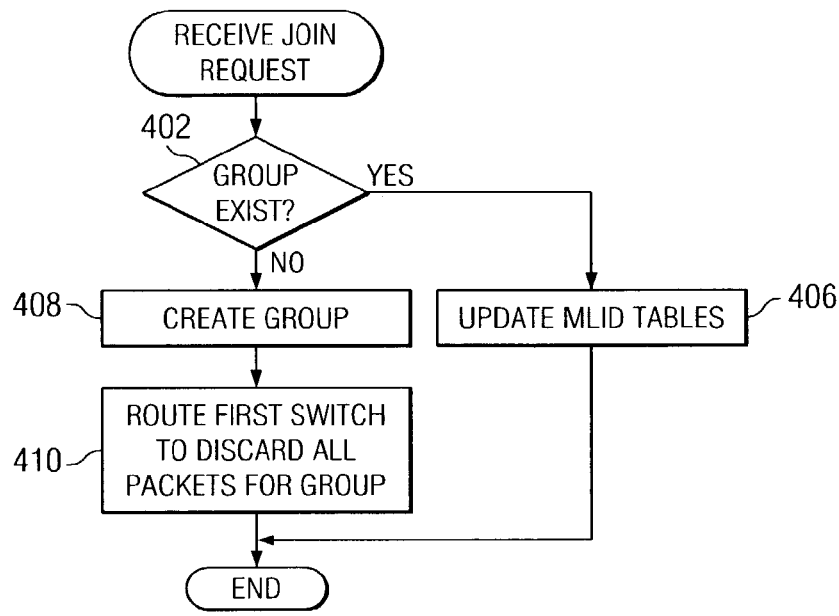
FIG. 4A is a flowchart illustrating the processing of a multicast group join request in accordance with a preferred embodiment of the present invention.

FIG. 4A is a flowchart illustrating the processing of a multicast group join request in accordance with a preferred embodiment of the present invention. The process begins when a multicast join request is received and a determination is made as to whether the multicast group already exists (step 402). If the group already exists, the process updates the MLID tables (step 404).

If the multicast group does not exist in step 402, the process creates the group (step 408), assigning a MLID to the group. Then, the process routes the first switch such that all packets for the group are discarded (step 410). Thereafter, the process ends. Thus, when a group is created with only a single member, a MLID is assigned and the single existing node is allowed to send to the group. The node need not receive extraneous packets about created and deleted groups. According to the process described above, when a receiving member joins the group, the MLID tables are updated to then route the packets to the receiving member nodes.

Figure 4B:
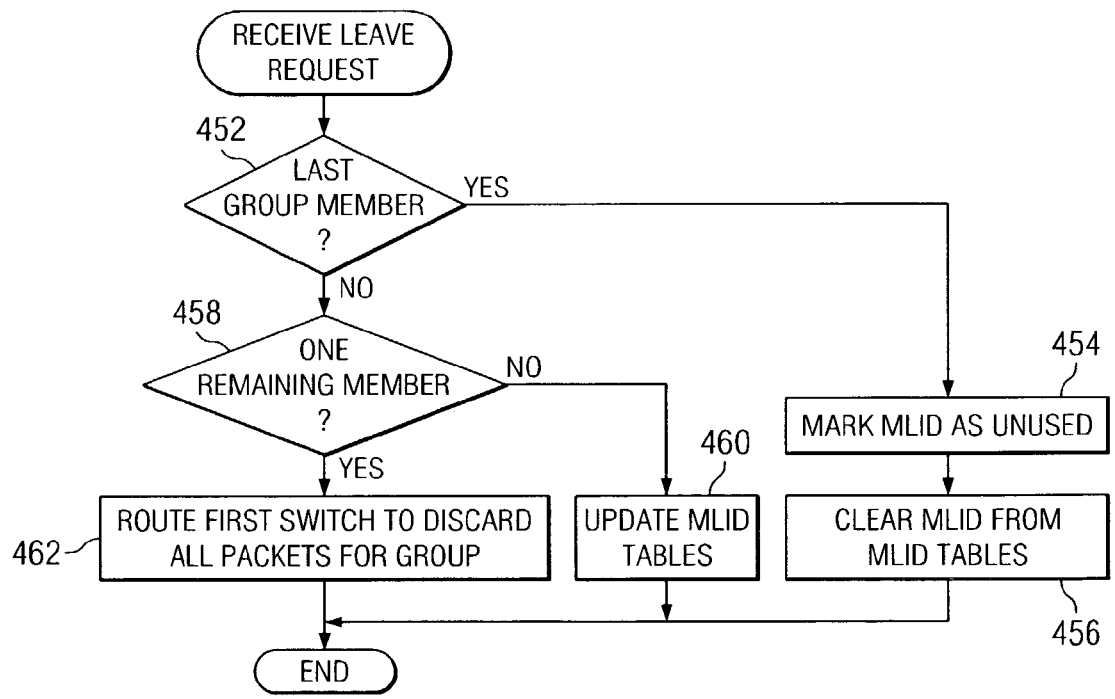
FIG. 4B is a flowchart illustrating the processing of a multicast group leave request in accordance with a preferred embodiment of the present invention.

Turning now to FIG. 4B, a flowchart illustrating the processing of a multicast group leave request is shown in accordance with a preferred embodiment of the present invention. The process begins when a multicast leave request is received and a determination is made as to whether the requester is the last group member (step 452). If the requester is the last group member, the process marks the MLID as unused (step 454), clears the MLID from the MLID tables in the switches (step 456) and ends.

If the requester is not the last group member in step 452, a determination is made as to whether a single member remains in the group (step 458). If more than one member remains in the group, the process updates the MLID tables (step 460) and ends.

Otherwise, if a single member remains in the group in step 458, the process routes the first switch connected to the remaining member to discard all packets for the group (step 462). Thereafter, the process ends. Thus, when receiving members leave the group such that only a single member remains, the remaining node is still allowed to send to the group. The remaining node need not receive extraneous packets about created and deleted groups, even if the node is an SWR node. According to the process described above, when a receiving member joins the group, the MLID tables are again updated to then route the packets to the receiving member nodes.

Therefore, the present invention solves the disadvantages of the prior art by providing a method and apparatus for managing multicast groups with send-without-receive (SWR) joiners without the use of traps on creation and deletion of groups. The prior art avoids assigning MLIDs to groups without receivers. This is a concern when the number of MLIDs that may be assigned is limited. However, the present invention recognizes that the number of possible MLIDs may not be a problem. Furthermore, as the amount of memory in IB switches increases, the number of MLID entries that may be stored also increases. In fact, current switches may include MLID tables supporting a thousand or more entries, which is more entries than there will generally be multicast groups.

The mechanism of the present invention maintains group information continuously while the SWR member exists. The SWR node need not receive extraneous messages about every multicast group that is created or deleted. Thus, the burden on the SWR node, the subnet administrator node, and all of the switches in between is lessened by the present invention. Also, the MLID remains assigned to the group as long as the SWR is a member. Therefore, the likelihood of the SWR node sending packets to the wrong group is diminished.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for managing multicast groups in an InfiniBand system area network, the apparatus comprising:

InfiniBand end nodes in the InfiniBand system area network being final destinations for packets, said InfiniBand end nodes comprising a computer recordable-type medium;

said InfiniBand end nodes do not include switches or routers, and packets are not routed through said InfiniBand end nodes;

a Subnet Administration in a first InfiniBand end node that receives a join request from a second InfiniBand end node for joining a multicast group, wherein the second InfiniBand end node is connected to a first switch and wherein the join request is a send-without-receive request that specifies that the second InfiniBand end node is to be a send-without-receive member of the multicast group that can send packets but will not receive packets, and wherein the first InfiniBand end node is included within the InfiniBand system area network, and further wherein switches in the InfiniBand system area network route packets from the second InfiniBand end node but do not route any packets to the second InfiniBand end node;

the Subnet Administation determines whether the multicast group exists;

the Subnet Administration in the first InfiniBand end node creates the multicast group, wherein the multicast group is not created by a switch, wherein when the multicast group is created, the second InfiniBand end node is the only member of the multicast group and the multicast group includes no members that receive packets; and the Subnet Administration routes the first switch to discard all packets for the multicast group if the multicast group does not exist.

2. The apparatus of claim 1, wherein the Subnet Administration for creating the multicast group includes the Subnet Administration for assigning an InfiniBand multicast local identifier (MLID) to the multicast group, and further wherein the multicast group is not created by a switch.

3. The apparatus of claim 1, wherein the Subnet Administration for routing includes the Subnet Administration for inserting an entry for the multicast group in a multicast routing data structure in the first switch.

4. The apparatus of claim 1, further comprising:

the Subnet Administration, responsive to a join request from a receiving end node, for causing an update of at least one multicast routing table for at least one switch in the system area network to route packets for the multicast group to the receiving end node.

5. An apparatus for managing multicast groups in an InfiniBand system area network, the apparatus comprising:

InfiniBand end nodes in the InfiniBand system area network being final destinations for packets, said InfiniBand end nodes comprising a computer recordable-type medium;

said InfiniBand end nodes do not include switches or routers, and packets are not routed through said InfiniBand end nodes;

a Subnet Administration in a first InfiniBand end node that receives a leave request from a second InfiniBand end node for leaving a multicast group, wherein the multicast group has a first member at a third end node connected to a first switch, and wherein the multicast group is identified using an InfiniBand multicast local identifier (MLID), and wherein the first InfiniBand end node is included within the InfiniBand system area network, and further wherein the first member is a send-without-receive member that can send packets but will not receive packets, and still further wherein switches in the InfiniBand system area network route packets from the first member but do not route any packets to the first member;

the Subnet Administation determines whether the first member is the only remaining member in the multicast group; and the Subnet Administration in the first InfiniBand end node routes the first switch to discard all packets from the first member if the first member is the only remaining member in the multicast group.

6. The apparatus of claim 5, wherein the multicast routing data structure is indexed by the InfiniBand multicast local identifier (MLID).

7. The apparatus of claim 5, further comprising:

the Subnet Administration, responsive to a join request from a receiving end node, for causing an update of at least one multicast routing table for at least one switch in the system area network to route packets for the multicast group to the receiving end node 8. A computer program product, stored in a computer recordable-type medium, for managing multicast groups in an InfiniBand system area network, the computer program product comprising:

instructions for receiving, by a Subnet Administration in a first InfiniBand end node, a join request from a second InfiniBand end node for joining a multicast group, wherein the second InfiniBand end node is connected to a first switch and wherein the join request is a send-without-receive request that specifies that the second InfiniBand end node is to be a send-without-receive member of the multicast group that can send packets but will not receive packets, and wherein the first InfiniBand end node is included within the InfiniBand system area network, and further wherein switches in the InfiniBand system area network route packets from the second InfiniBand end node but do not route any packets to the second InfiniBand end node, InfiniBand end nodes in the InfiniBand system area network being final destinations for packets, said InfiniBand end nodes do not include switches or routers, and packets are not routed through said InfiniBand end nodes;

instructions for determining whether the multicast group exists; and instructions for creating, by the Subnet Administration in the first InfiniBand end node, the multicast group and routing the first switch to discard all packets for the multicast group if the multicast group does not exist, wherein when the multicast group is created, the second InfiniBand end node is the only member of the multicast group and the multicast group includes no member that will receive packets.

9. A computer program product, stored in a computer recordable-type medium, for managing multicast groups in an InfiniBand system area network, the computer program product comprising:

instructions for receiving, by a Subnet Administration in a first InfiniBand end node, a leave request from a second InfiniBand end node for leaving a multicast group, wherein the multicast group has a first member at a third end node connected to a first switch, and wherein the multicast group is identified using an InfiniBand multicast local identifier (MLID), and wherein the first InfiniBand end node is included within the InfiniBand system area network, and further wherein the first member is a send-without-receive member that can send packets but will not receive packets, and still further wherein switches in the InfiniBand system area network route packets from the first member but do not route any packets to the first member, InfiniBand end nodes in the InfiniBand system area network being final destinations for packets, said InfiniBand end nodes do not include switches or routers, and packets are not routed through said InfiniBand end nodes;

instructions for determining whether the first member is the only remaining member in the multicast group; and instructions for routing, by the Subnet Administration in the first InfiniBand end node, the first switch to discard all packets from the first member if the first member is the only remaining member in the multicast group.

* * * * *